(12) United States Patent
Sugiura et al.

(10) Patent No.: US 6,714,729 B1
(45) Date of Patent: Mar. 30, 2004

(54) AUTOMATIC MOTION-CONTROLLED PHOTOGRAPHING APPARATUS AND RELATED PHOTOGRAPHING METHOD

(75) Inventors: Shinichi Sugiura, Sendai (JP); Kazuhiro Otsuki, Tokyo (JP); Ken Nishiwaki, Tokyo (JP)

(73) Assignee: NTT Infrastructure Network Corporation, Tokyo (JP)

( * ) Notice: Subject to any disclaimer, the term of this patent is extended or adjusted under 35 U.S.C. 154(b) by 0 days.

(21) Appl. No.: 10/382,238

(22) Filed: Mar. 5, 2003

(30) Foreign Application Priority Data

Sep. 6, 2002 (JP) .................................... P2002-261930

(51) Int. Cl.[7] .............................................. G03B 37/00
(52) U.S. Cl. ........................................ 396/19; 396/428
(58) Field of Search ............................... 396/19, 58, 59, 396/428

(56) References Cited

U.S. PATENT DOCUMENTS 4,922,275 A * 5/1990 Hughes ...................... 396/427
4,949,108 A * 8/1990 Verret ......................... 396/20
5,066,970 A * 11/1991 Kakita et al. .................. 396/50
2003/0128975 A1 * 7/2003 Shevick ...................... 396/428

FOREIGN PATENT DOCUMENTS

JP          06-167760          6/1994
JP          06-189180          7/1994

* cited by examiner

*Primary Examiner*—David M Gray
(74) *Attorney, Agent, or Firm*—Kilpatrick Stockton, LLP (57) ABSTRACT

An automatic motion-controlled photographing apparatus, according to the present invention, a rotatable turntable is located above an upper surface of a box of a controller fixedly supported on a tripod, and a camera is set onto the turntable. The turntable, on which the camera is set, is rotated at a given angle of rotation responsive to a signal from a turntable drive circuit disposed in the controller, and a shutter of the camera is turned on via a non-contact signal relay in response to a signal from a shutter drive circuit for photographing the same photograph images, each in one frame, at an angle of 360 degrees as those of an on-site field.

8 Claims, 8 Drawing Sheets

AUTOMATIC MOTION-CONTROLLED PHOTOGRAPHING APPARATUS AND RELATED PHOTOGRAPHING METHOD

BACKGROUND OF THE INVENTION

1. Field of the Invention

The present invention relates to an automatic motion-controlled photographing apparatus and related photographing method suitable for photographing interiors of underground structures such as a manhole, and a hand hole.

2. Description of the Related Art

In general, due to the presence of various cables located in and extending through interiors of underground structures such as a manhole and a hand hole, there is a need for managing installed statuses of the cables accommodated in the underground structure and managing facilities installed in a body of the underground structure.

It has been a usual practice for a person to directly enter the underground structure such as the manhole or the hand hole and make sketches of the same, with the sketches describing the positions of the cables to prepare maintenance and facility management data.

Maintenance and management data are prepared for the purpose of confirming the current cable statuses, or conducting study for a capability of a subsequent cable to be accommodated and conducting study for inspection and repair of the underground structure.

When preparing maintenance and management data using photographs, the interior of the underground, such as the manhole, must be photographed at an angle of 360 degrees. In this case, an attempt has been made to provide a means, disclosed in a related material 1 (Japanese Patent Provisional Publication No. H6-167760), which allows a scenery, that is not the underground structure, to be photographed at the angle of 360 degrees in place of a technology for the person to take a camera to photograph the interior of the underground at the angle of 360 degrees.

The related material 1 is directed to a private camera with a structure in which a camera rotation control mechanism 52, as shown in FIG. 1 of the related material 1, and a controller 61, as shown in FIG. 2 of the related material 1, are preliminarily assembled.

A related material 2 is directed to a special camera in which a camera 1 and a tripod 2 are unitarily formed in a manner as shown in FIGS. 1 and 3 of the related material 2.

SUMMARY OF THE INVENTION

However, when making the sketches by hands during preparation of maintenance and management data, the presence of work that needs a considerable length of time and is labor intensive and the occurrence of factors overlooked by the worker result in a discrepancy between actual conditions in the field and data that are prepared to cause an inaccuracy in maintenance and management data to be prepared, thereby exhibiting an issue in which the field occasionally needs to be inspected again.

On the other hand, when preparing maintenance and management data, since the photographs show images indicative of partial areas, respectively, of the interior of the underground structure one by one, there is a need for taking a stitch editing work to allow the respective photographs to be joined in order to obtain an entire image.

Related art technologies, needed for the person to enter the underground structure while carrying the camera to photograph the interior at the angle of 360 degrees, require the persons to be skilled in obtaining a series of accurate photograph images without omission.

While photographing at the angle of 360 degrees can be performed by utilizing the related materials 1 or 2 set forth above, since the related art structure employs the private camera or the specific camera, disclosed in the Related materials set forth above, that incorporate all the mechanisms inside the camera bodies, resulting in complicated structures. Also, another issue resides in an inability of using a commercially available camera. Moreover, the related art structure is hard to be used in a narrow space such as the hand hole where the worker cannot directly enter and, even when the worker is able to directly enter the underground structure, there is a need for preliminarily conducting working steps for safety such as ventilating works.

To address such an issue, the present invention has an object to provide an automatic motion-controlled photographing apparatus and related photographing method wherein, not only in an area where a person can enter but also even in an area inside an underground structure in a narrow space or in an area with an oxygen deficiency, enables a commercially available camera to be used to provide photographs accurately grasping interior statuses based on which maintenance and facility management data can be prepared.

To achieve the above object, the present invention provides an automatic motion-controlled photographing apparatus, comprising: a vertically extending and retracting tripod having a mount section; a controller fixedly supported on the mount section; a turntable rotatably supported on an upper surface of a box of the controller; and a camera detachably supported on an upper surface of the turntable; wherein the controller includes a turntable drive circuit operative to rotate at least the turntable at a given rotational angle that is determined at an arbitrary angle, and a shutter drive circuit operative to turn on a shutter of the camera supported on the turntable via a non-contact signal relay at a time instant when rotation of the turntable at the given angle has been terminated.

DETAILED DESCRIPTION OF THE INVENTION

A detailed description is given below to a first embodiment of the present invention with reference to FIGS. 1 to 4.

Figure 1:
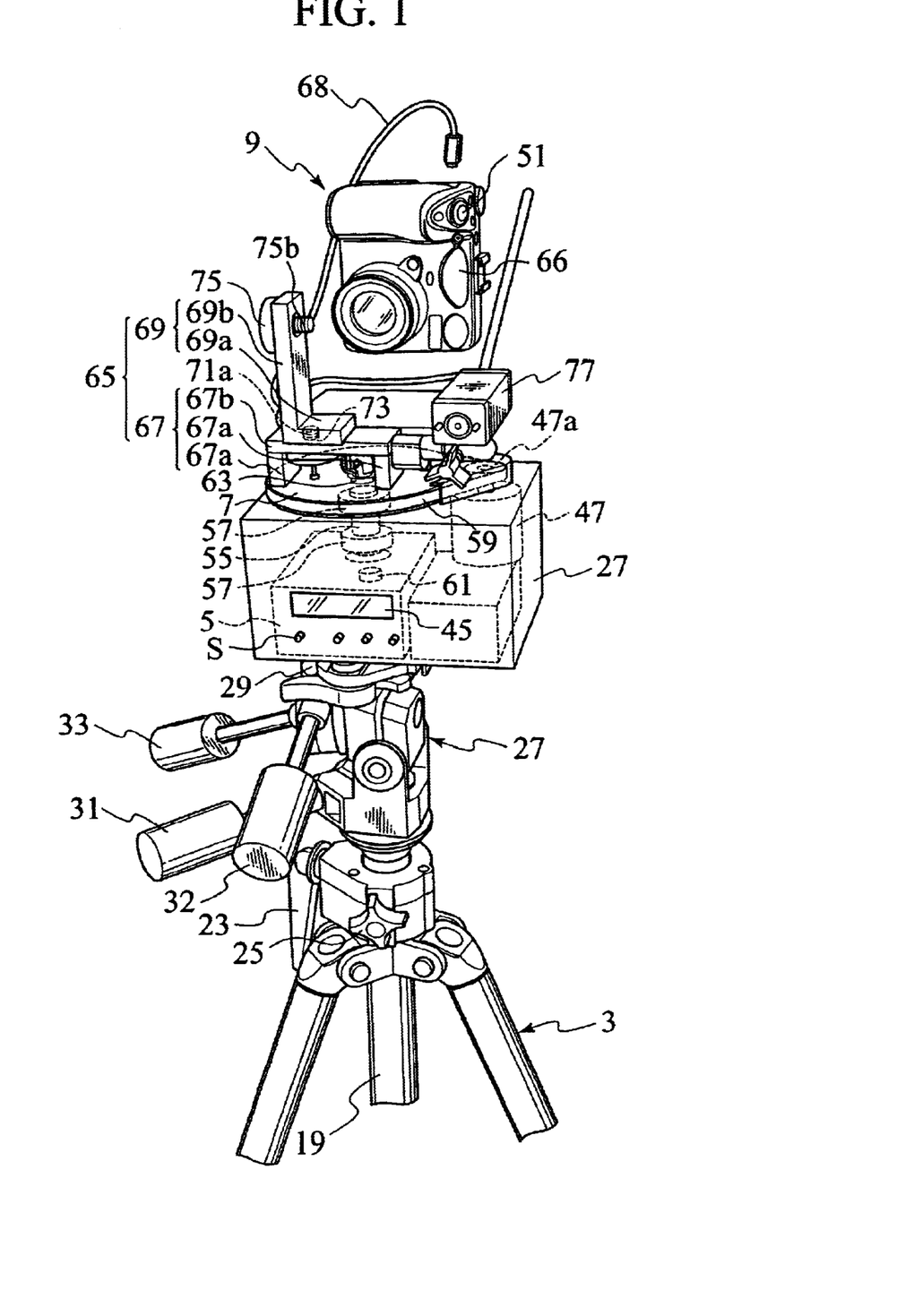
FIG. 1 is a schematic perspective view of an automatic motion-controlled photographing apparatus according to the present invention with a camera being shown in a removed state.
Figure 2:
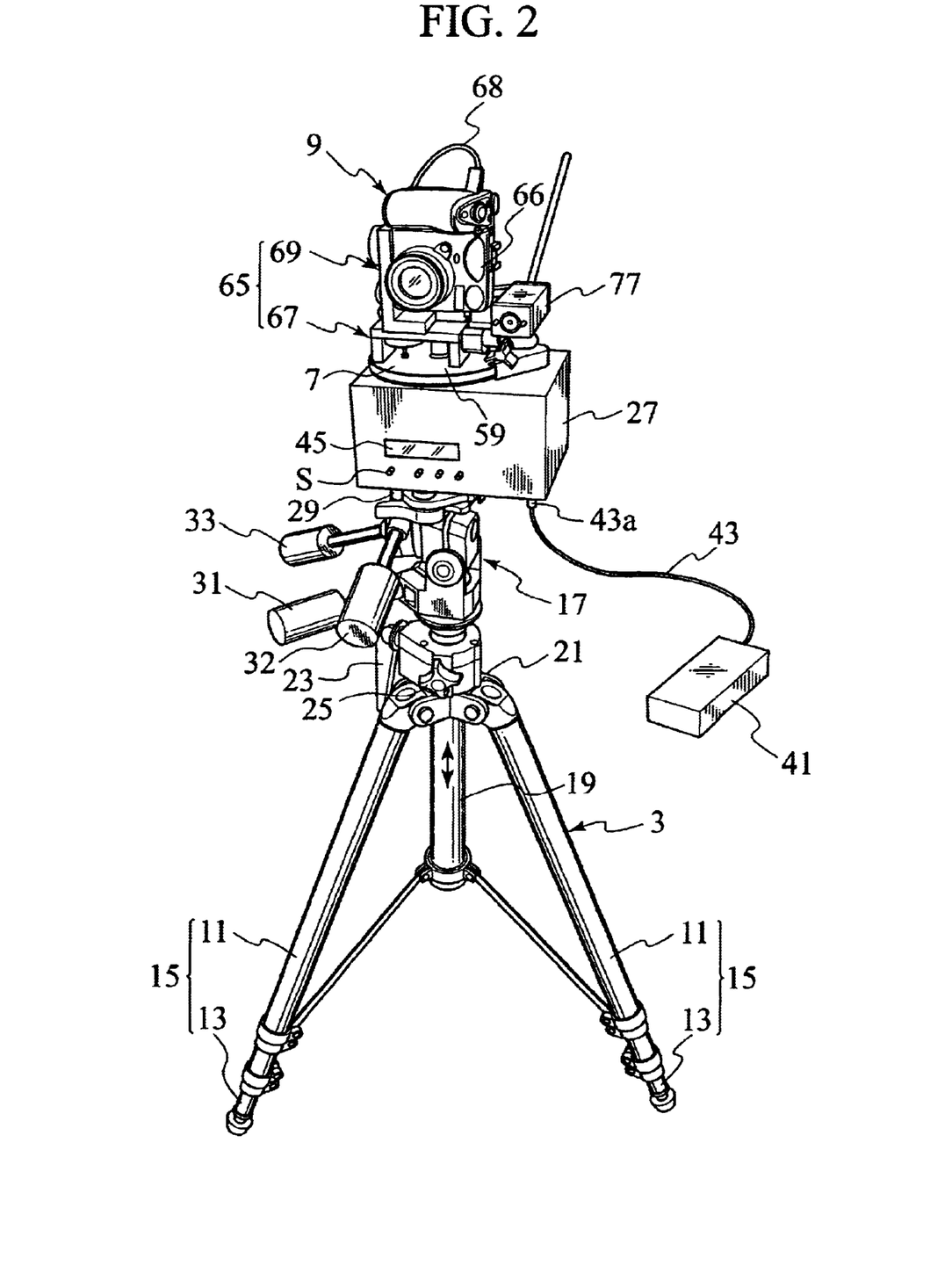
FIG. 2 is a schematic perspective view of a whole of the automatic motion-controlled photographing apparatus.

FIG. 1 is a perspective view illustrating an automatic motion-controlled photographing apparatus 1 with a camera 9 remaining in a removed state, and FIG. 2 is a perspective view of a whole structure of the automatic motion-controlled photographing apparatus 1. The automatic motion-controlled photographing apparatus 1 is comprised of a tripod 3, a controller 5, a turntable 7 and the camera 9. The tripod 3, the controller 5 and the turntable 7 are unitarily configured in a unit structure to be independent from the camera 9. The tripod 3 and the controller 5 are provided as a separable structure, whereby it is possible to use a camera on the market for the camera 9 of the apparatus 1.

The tripod 3 is comprised of three expanding and contracting telescopic leg arms 15, each composed of an outer sleeve 11 and an inner sleeve 13, and an elevator arm 19 equipped with a mount section 17.

The collapsable three telescopic leg arms are supported by a mount bracket 21, thereby forming a three-leg structure that enables the leg arms to be individually and freely set at respective different angles. In an alternative case, the telescopic leg arms 15 may include four pieces of leg arms.

The elevator arm 19 vertically extends through a central area of the mount bracket 21 such that rotating an operating handle 23, fixed to the mount bracket 21 for fine adjustment capabilities, rightward or leftward causes the elevator arm 9 to move upward or downward by means of a usual rack and pinion mechanism (not shown).

Positioning of the elevator arm 19 is carried out by rotating a fixing handle 25 to cause a distal end (not shown) of a screw strut of the fixing handle 25 to be strongly brought into pressured contact with a circumferential periphery of the elevator arm 19, thereby enabling the elevator arm 19 to be kept in a fixedly retained condition. Also, releasing the fixing handle 25 from the pressured contact condition can carry out vertical movement of the elevator arm 19.

The mount section 17 of the elevator arm 19 has its upper surface mounted with a box 27 encompassing the controller 5 and has a spirit level 29, enabled to view in a vertical direction at a horizontal angle, and a plurality of operation levers 31, 32, 33. The plurality of operation levers 31, 32, 33 form control levers that control fore and aft inclined angles and right and left inclined angles of the mount section 17, and adjusting the inclined angle of the mount section 17 while looking at the spirit level 29 enables the mount section 17 to be fixed in a horizontally correct condition.

Figure 4:
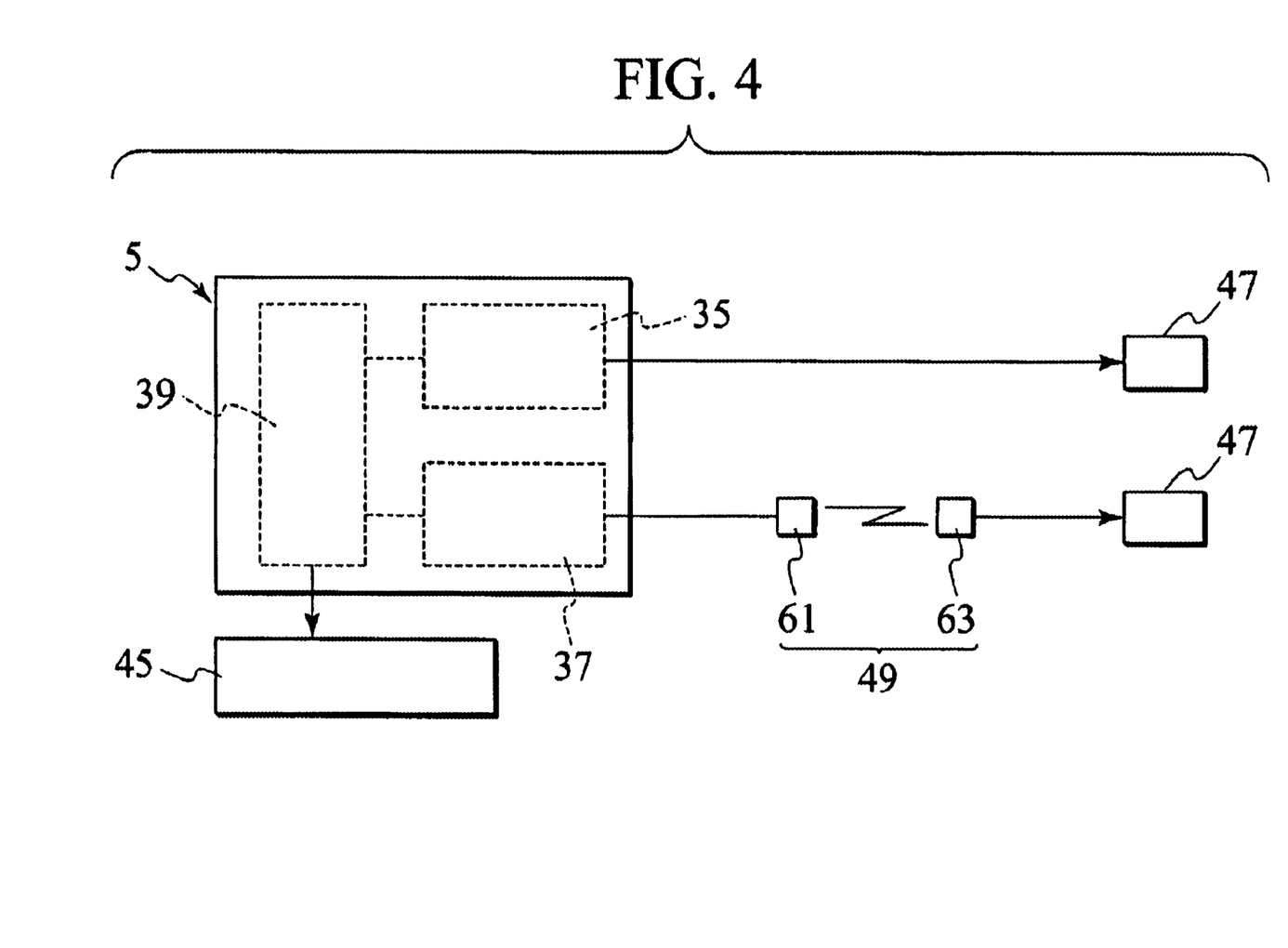
FIG. 4 is a block diagram of a controller.

As shown in FIG. 4, the controller 5 includes a turntable drive circuit 35, a shutter drive circuit 37 and a mode display drive circuit 39, and is applied with a direct current electric power by connecting a terminating connection terminal 43a of a power cable 43 extending from a portable battery 41 to an input terminal of the box 27 as shown in FIG. 2.

The mode display drive circuit 39 is applied with various conditions such as a rotational angle, serving as a picture angle, of the turntable 7 to be set, information indicative of how many number of photographs are taken, and a command for setting the number of photographs to be taken to provide displays indicative of input contents, that have been set, over a display window (structured with a liquid crystal display) 45 of the box 27.

The turntable drive circuit 35 responds to a rotational angle setting mode of the turntable 7 set by the mode display drive circuit 39 and applies a given-time-interval electric current signal to a driver motor 47 for driving the turntable 7. In particular, using a stepping motor, which incrementally rotates in response to pulse signals, as the drive motor 47 enables the rotational angle to be controlled depending on the number of pulse signals and, so, applying prescribed number of the pulse signals intermittently to the stepping motor enables the turntable 7 to be quantitatively rotated in repetitive movements such that, when the turntable 7 rotates at a given rotational angle, rotation of the turntable 7 is terminated once and, when the turntable 7 further rotates again at another given rotational angle, rotation of the turntable 7 is further terminated.

The rotational angle at which the turntable 7 rotates is configured to be set at a suitable angle to allow the photograph image to be taken at an arbitrarily desired picture angle. In this case, it is preferable for the rotational angle to be selected in a range of approximately 20 to 25 degrees. This is because of the fact that, even when using the commercially available camera, the camera suffices to take photograph images in a minimum number of frames in order to photograph at 360 degrees while the photograph images have given amounts of margins to be trimmed to provide an ease of stitch editing work such that adjacent photograph images can be appropriately connected.

The shutter drive circuit 37 has a function to turn on a shutter 51 of the camera 9 via a non-contact signal relay 49 in response to an input signal generated when the turntable 17 is caused to rotate and terminated in rotation at a given angle.

In this case, in order for the photographing apparatus to comply with a variety of commercially available cameras, the shutter drive circuit 37 is arranged to operate in two modes in response to the input signals generated when rotation of the turntable 7 is terminated at the given, i.e., a first mode in which the shutter 51 is concurrently turned on when rotation of the turntable 7 is terminated at the given angle and a second mode in which the shutter 51 is turned on after a certain time interval (in the order of seconds) has elapsed when rotation of the turntable 7 is terminated at the given angle.

The turntable 7 is disposed on an upper surface of the box 27. A table shaft 55 of the turntable 7 is internally hollow and is supported for rotational movements by means of a pair of bearings 57. An outer periphery of the turntable 7 engages a timing belt 59, extending from a motor pulley 47a of the drive motor 47, through which a rotational drive power of the drive motor 47 is transferred to the turntable 7.

The non-contact signal relay 49 includes an infrared interface which is comprised of an infrared LED 61 electrically connected to the controller 5 and an infrared receptor 63 electrically connected to the camera 9.

The infrared LED 61 and the infrared receptor 63 are vertically disposed in opposition to one another via the hollow table shaft 55, that forms a rotational axis, to enable delivery of signals without an interference between the camera 9 on the rotating turntable 7 and the controller 5 which is held under a fixed condition.

Also, while, in this embodiment, the interface of the non-contact signal relay 49 has been described as using the infrared ray, it is of course to be noted that another expedient other than the infrared ray may be employed.

The camera 9 is fixedly mounted on the turntable 7 by means of a camera mount unit 65.

The camera 9 has various functions, required for usual cameras, such as a flush 66, a shutter 51, an exposure meter and shutter speed, etc. and the commercially available digital camera of an auto-focus type that allows the photograph image to be transferred to a personal computer for digital processing.

Between the shutter 51 and the flush 66, the flush 66 is configured to operate in a flush setting mode or a flush-release setting mode that is changed over by, manipulating an operational unit (not shown).

The shutter 51 is not manually operated and structured to receive the signal, such that the shutter 51 is turned on, inputted from the infrared receptor 63 via a control cable 68.

Further, the camera 9 is not intended to; be limited to such a digital camera and may include a camera of an optical system.

Figure 3:
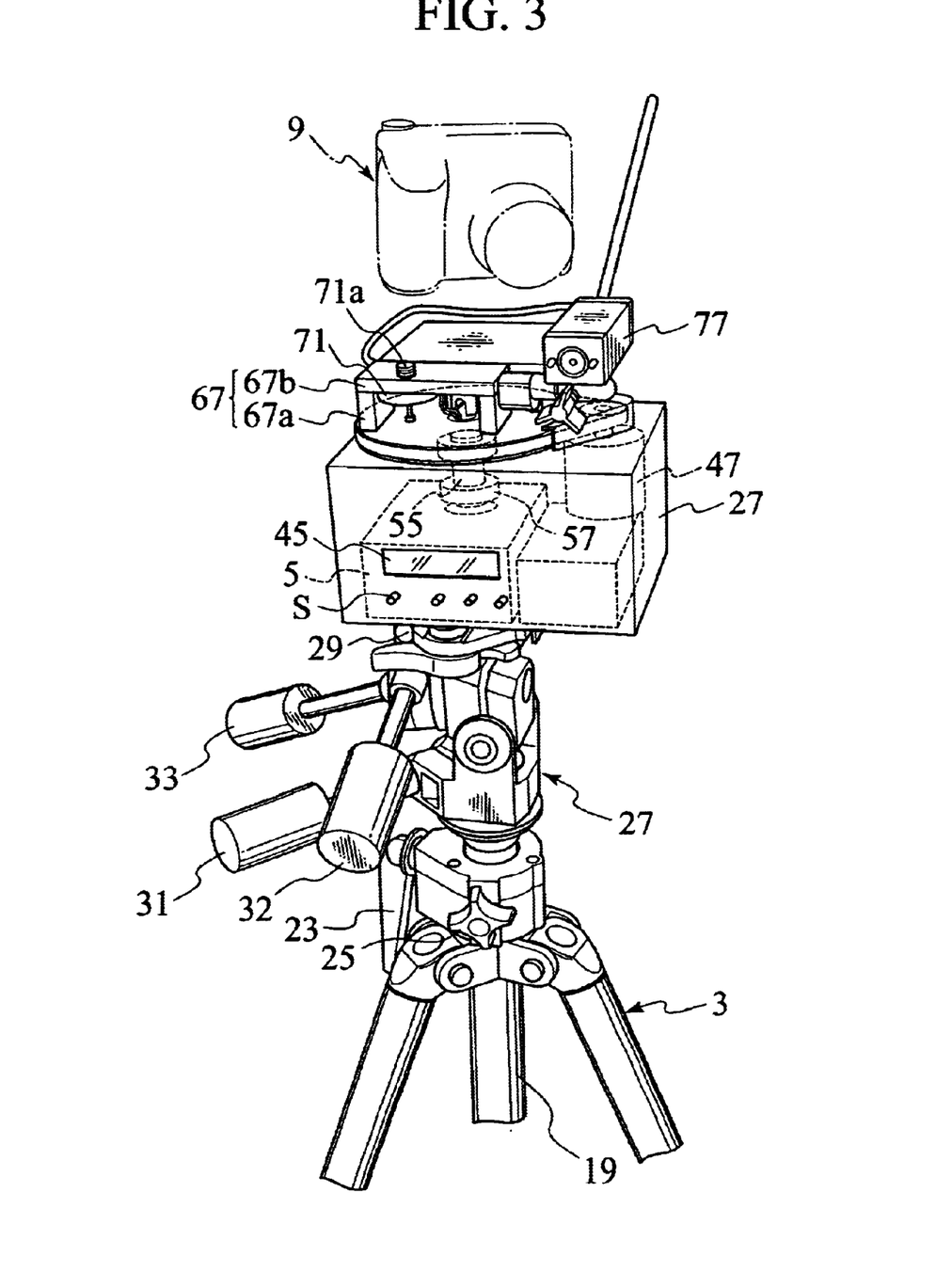
FIG. 3 is a schematic perspective view of the automatic motion-controlled photographing apparatus having a camera mount member on which a camera is adapted to be mounted in a standard mount position.

The camera mount unit 65 is comprised of a first mount section 57 and a second mount section 69, with the first mount section 67 being comprised of a pair of vertical segments 67a and a horizontal segment 67b connected thereto and formed in an oppositely oriented U-shaped configuration while the vertical segments 67a are unitarily and fixedly supported on an upper surface of the turntable 7 by some suitable fixture means such as screws.

A thread portion 71a of a first mount screw 71 protrudes upward from the underside at a central area of the horizontal segment 67b and is allowed to be screwed into an associated thread bore (not shown) formed at a bottom of the camera 9, thereby enabling the camera 9 to be mounted in a standard mount position to allow a length of the photograph image to be aligned in a transverse direction. When mounting the camera 9 in such a standard mount position, the photograph in one frame serves to widely cover an interior of an underground structure in a lateral direction.

The second mount section 69 is comprised of a horizontal segment 69a and an upright segment 69b that are formed in an independent angle shape and serves as an attachment to allow the camera 9 to be mounted in a longitudinally oriented position. The horizontal segment 69a of the second mount section 69 has a structure in which a thread bore 73 is formed and engages the threaded portion 71a of the first mount screw 71 to allow the second mount section 69 to be assembled onto the first mount section 67.

A second mount screw 75 is provided at an upper area of the upright segment 69b of the second mount section 69 such that a thread portion 75b protrudes inward from outside, and the thread portion 75b is allowed to be screwed into the associated thread bore (not shown) formed at the bottom of the camera 9, thereby enabling the camera 9 to be mounted in a longitudinally oriented position to allow the length of the photograph image to be aligned in a longitudinal direction as shown in FIGS. 1 and 2.

When mounting the camera 9 in such a longitudinally oriented position, since the photograph in one frame is enabled to widely cover the interior of the underground structure in a vertical direction, it is preferable for the camera to be normally used in such a longitudinally oriented position so as to avoid misalignment in photographing in which a portion of the photograph image in the vertical direction is lacked when photographing.

In this case, although a lateral width of the photograph image in one frame becomes narrower than that of the photograph image taken by the camera 9 mounted in the standard mount position, the longitudinally oriented mount position of the camera 9 has a capability of photographing in an area at an angle of 360 degrees and, hence, the camera 9 is enabled to cover an undesired situation, without troubles, by adjusting the rotational angle of the camera 9 at fine angles of rotation and increasing the number of photographing operations.

Also, in FIG. 1, reference numeral 77 designates a monitor camera which is adapted to be mounted for installation and removal capabilities to allow the monitor camera 77 to be removed in nonuse.

The automatic motion-controlled photographing apparatus 1 with such a structure is allowed to enter an interior of a manhole, where a person is able to enter, and the tripod 3 are opened and located, whereupon the camera 9 is set at a given position (height). Also, when setting the camera at that position, the position of the camera 9 can be confirmed permitting a monitor image taken by the monitor camera 77 to be reflected over the operation controller at hand (not shown). This enables the camera 9 to be reliably set to the given position. Operating a start button S to activate the controller 5 allows the turntable drive circuit 35 to output the signal upon which the turntable 7, on which the camera 9 has been set, is quantitatively rotated at a given rotational angle. Simultaneously, each time the turntable 7 rotates at the given incremental angle, the shutter 51 is turned on in response to the signal from the shutter drive circuit 37, thereby enabling accurate photograph images covering a range of 360 degrees to be obtained with no deviation in frames to be caused one by one.

During such photographing operation, the signal is delivered between the rotatable camera 9 and the controller 5 remaining at the fixed position via the non-contact signal relay 49 without interference, and it is possible for the stitch editing work, that joins the respective photograph images photographing the interior of the underground structure, to be easily performed. Also, the photograph images, which have been taken by the camera, include images that are photographed at certain time intervals and at the same height, the stitch editing work can be performed in the shorter time period than that required in the related art practice.

Further, the commercially available camera can be used as the relevant camera 9, and the photograph images provide a capability of preparing the same maintenance and facilities management data as that obtained in an on-site operation field.

Also, while this embodiment has been described with reference to a case where the current photographing apparatus 1 is used in the underground structure such as the manhole, the current photographing apparatus 1 may also be used inside a tunnel or a building, or may be used for the purpose of photographing a usual scenery.

FIGS. 5 to 8 show an automatic motion-controlled photographing apparatus 1, of a second embodiment according to the present invention, which is enabled to be used not only in an area where a person cannot enter but also in an underground structure with the danger of oxygen deficiency or harmful gases.

Figure 5:
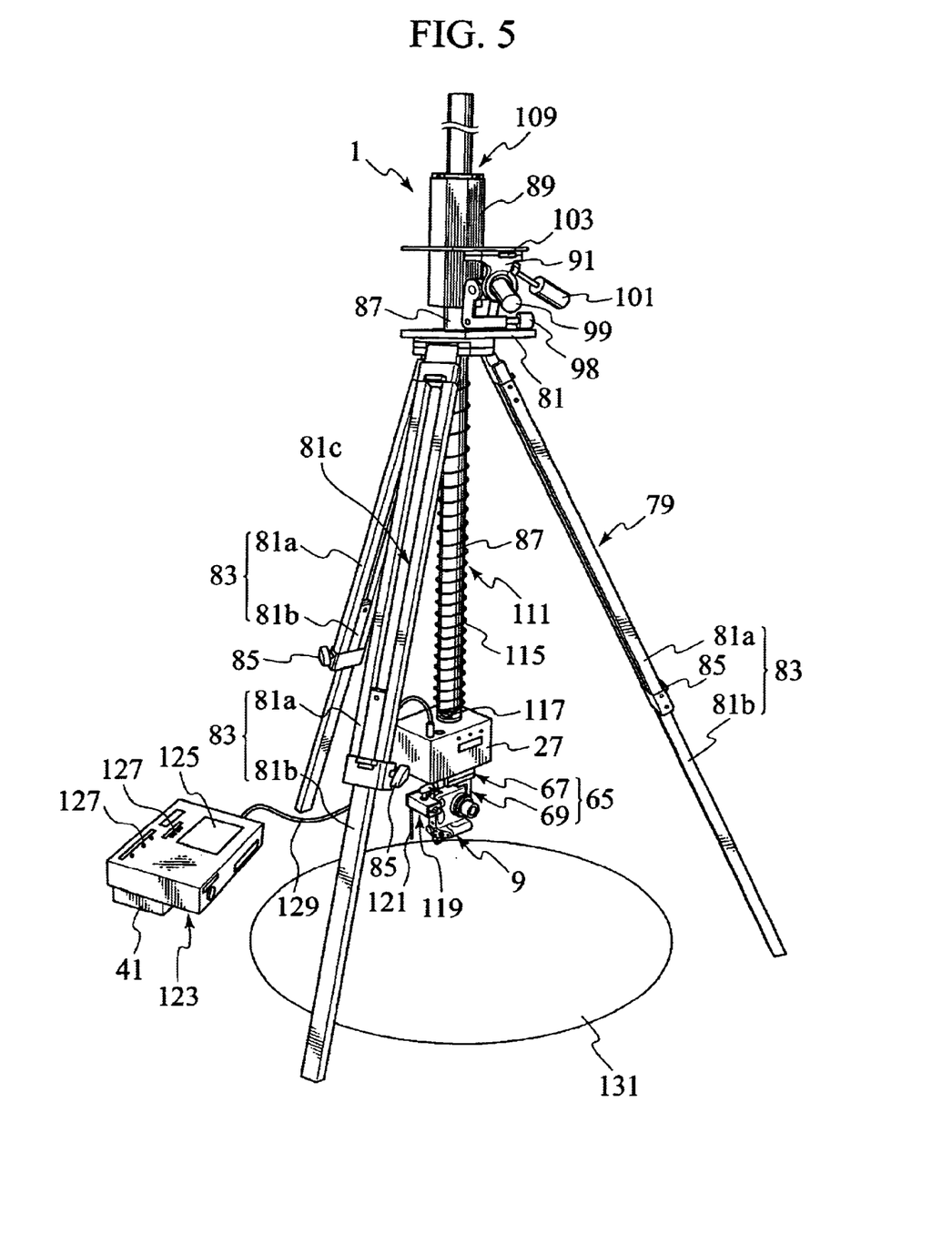
FIG. 5 is a schematic perspective view illustrating a whole of an automatic motion-controlled photographing apparatus of a second embodiment according to the present invention.

Also, the same component parts bear the same reference numerals as those used in the first embodiment A tripod 79 of the automatic motion-controlled photographing apparatus 1 is formed in a structure that includes three leg arms 83 which are able to assume a folding condition and leg-opened condition with respect to a support plate 81. Each of the leg arms 83 is comprised of a fixed arm portion 81a supported on the support plate 81 and a movable arm portion 81b that is slidable for extending and contracting capabilities with respect to the fixed arm 81a, and tightening a fixing screw 85 provided at the fixed arm portion 81a allows the movable arm portion 81b to be fixedly secured in a recess 81c of the fixed arm portion 81a at a desired position.

A central area of the support plate 81 has a vertically penetrating opening aperture (not shown) along a central axis of which a retainer sleeve section 89 is disposed to support a longitudinally extending elevator shaft 87 for elevating capabilities.

The retainer sleeve section 89, which has a vertically penetrating internal space, is fixedly supported on the support plate 81 at an upper area of the opening portion thereof by means of a mount control member 91 such that a central axis line of the internal space of the retainer sleeve section 89 is aligned with a central axis line of the opening portion of the support plate 81.

Figure 7:
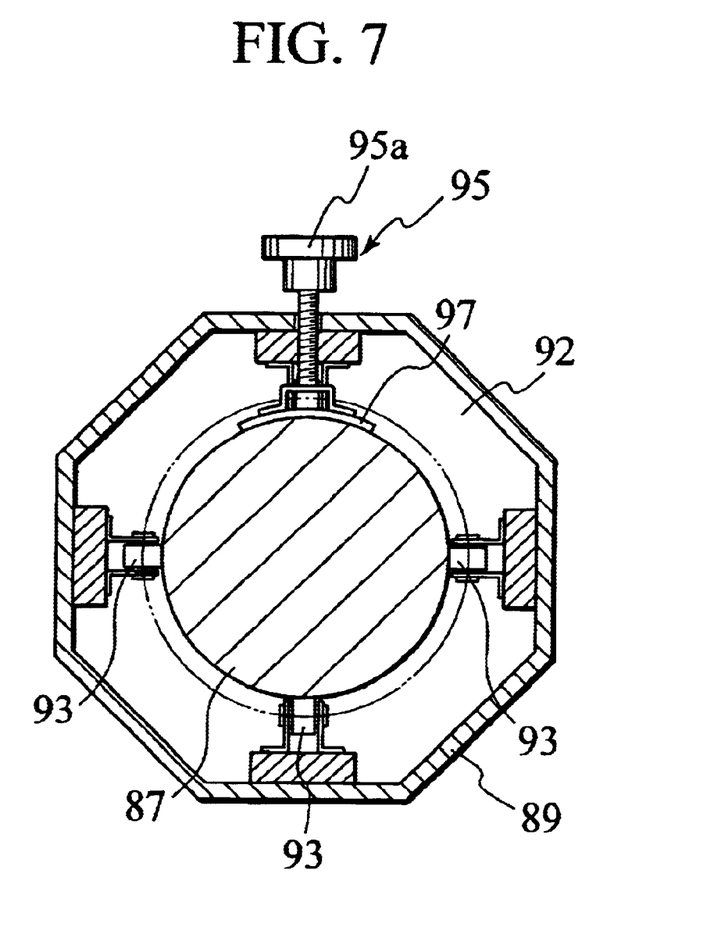
FIG. 7 is a cross sectional view taken on line VII—VII of FIG. 6.

The retainer sleeve section 89 has guide rollers 93 located in the internal space 92 as shown in FIG. 7 to serve as guide portions for supporting an outer periphery of the elevator shaft 87 at four engaging points, and a shaft fixing screw 95 serving as a fixing and supporting means that allows the elevator shaft 87 to be coupled or uncoupled. The guide rollers 93 are located at four circumferentially spaced positions (with one guide roller being not shown) angled at 90 degrees, with three sets of four guide rollers 93, located at the circumferentially spaced positions, being disposed in a structure at three mount positions displaced in a vertical direction. Accordingly, the elevator shaft 87 is supported at its outer periphery at the four points with respect to the circumferential periphery and also supported at three support areas in the vertical direction and, thus, the elevator shaft 87 is enabled to be correctly guided in a vertical direction along the central axis line without deviation.

Tightening the shaft fixing screw 95 through the use of an operator segment 95a causes a contact plate 97, located at a distal end of the screw, to be brought into strongly pressured contact with the outer circumferential periphery of the elevator shaft in a surface contact condition for thereby ensuring a fixed state of the elevator shaft 87. Also, loosening the tightened state of the operator segment 95a allows the contact plate 97 to be separated from the elevator shaft 87 for thereby enabling an uncoupled state of the elevator shaft 87 to be obtained.

The mount control member 91 includes a first lever 98, a second lever 99 and a third lever 101 and, additionally, a spirit level 103 enabled to view in a vertical direction at a horizontal angle. Operating the first, second and third levers 98, 99, 101 while viewing through the spirit level 103 enables an inclination of the retainer sleeve section 89 to be adjusted in fore and aft and lateral directions such that the retainer sleeve section 89 can be set at a correct position.

Figure 8:
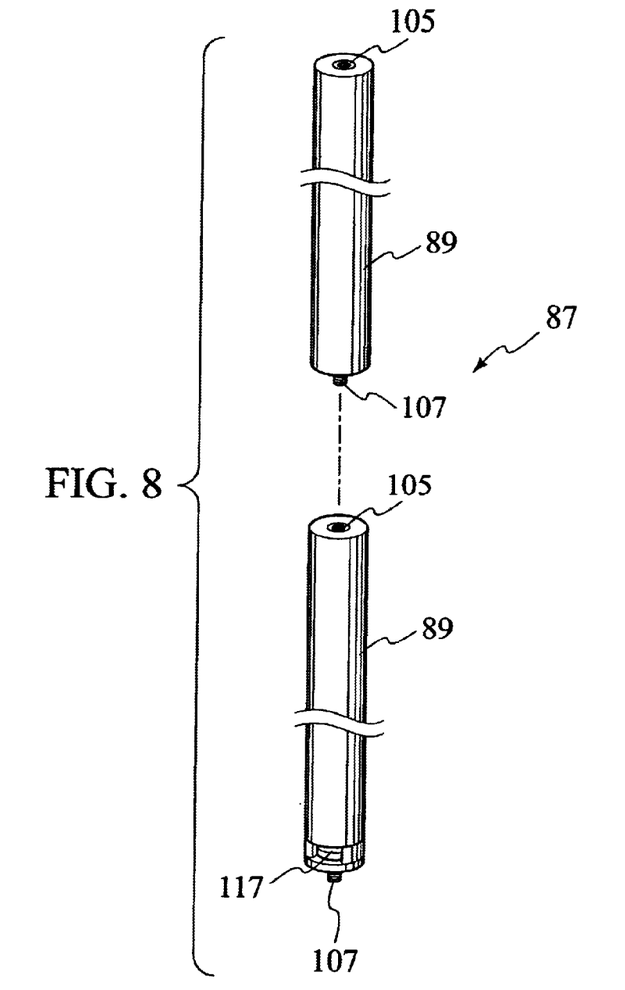
FIG. 8 is a schematic view illustrating an elevator shaft divided into a plurality of pieces along a longitudinal length of the shaft.

The elevator shaft 87 is made from aluminum material in a cylindrical shape to provide a light weight and is comprised of a plurality of cylindrical components 89 that are separated in a longitudinal direction for easy delivery. This allows the elevator shaft 87 to be easily carried.

More particularly, as shown in FIG. 8, the cylindrical component 89 has one end formed with a thread bore 105 and the other end formed with a thread screw 107 adapted to engage the thread bore 105 of another cylindrical component 89. Thus, by tightening the screw portion 107 of one cylindrical component 89 to the thread bore 105 of another cylindrical component 89, the plural cylindrical components 89 are sequentially extended to allow a vertically elongated elevator shaft 87, that is longitudinally contiguous, to be obtained.

The elevator shaft 87 has a first stopper member 109 and a second stopper member 111 to avoid the fall of the elevator shaft 87.

Figure 6:
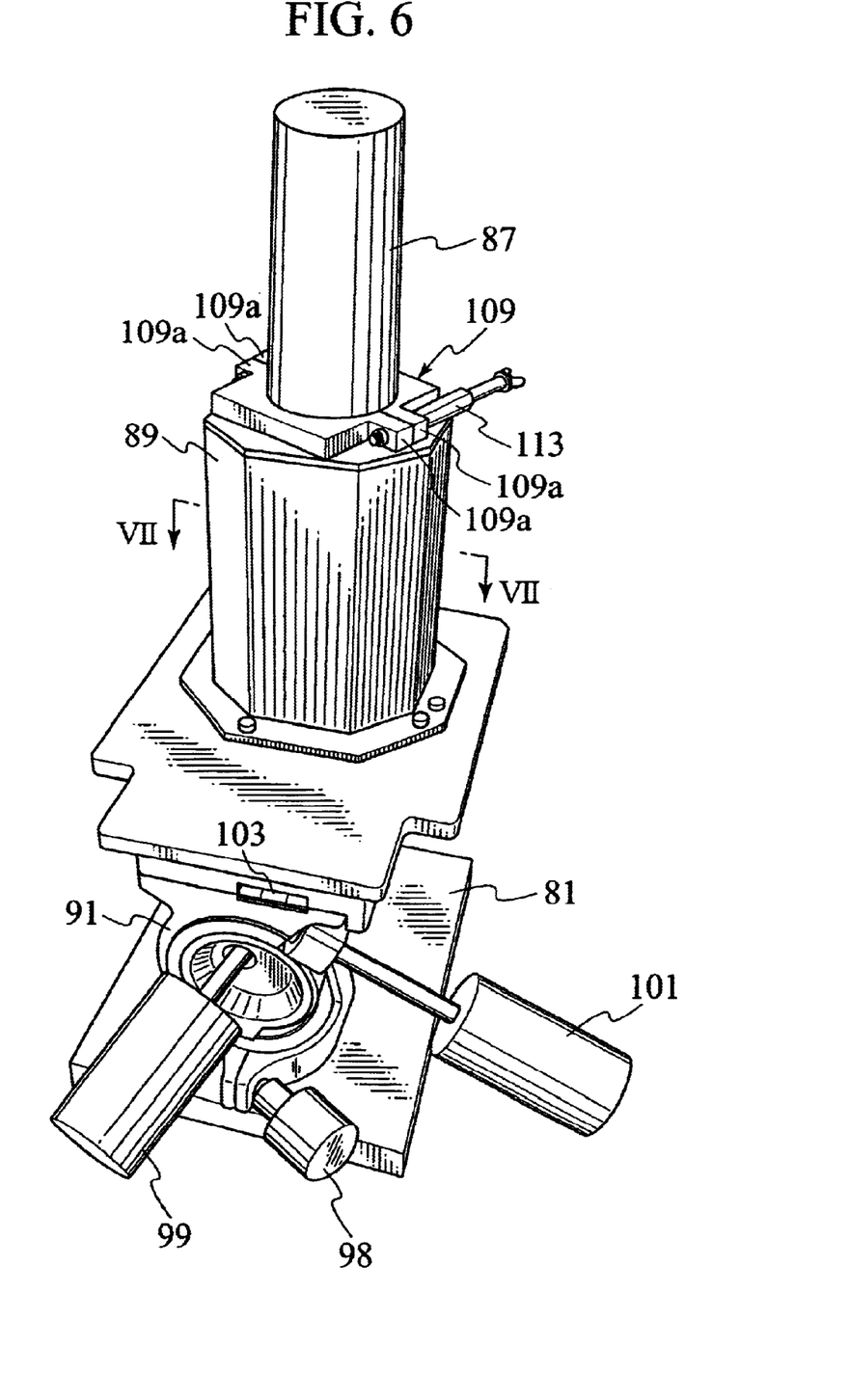
FIG. 6 is a view illustrating a status to show how a first stopper member is mounted.

The first stopper member 109 is formed in a ring shape that includes two removable coupling segments 109a, 109a located above the retainer sleeve section 89 as shown in FIG. 6. The first stopper member 109 has a structure to be unitarily and fixedly supported by the outer circumferential wall of the elevator shaft 87 by tightening the coupling segments 109a, 109a by means of coupling screws 113 whereas upon loosening the coupling screws 113 allows a stopper position to be freely set. Accordingly, causing the first stopper member 109 to be held in abutting engagement with an upper terminal edge of the retainer sleeve section 89 enables the elevator shaft 87 to be avoided from falling to the extent than required.

Figure 9A:
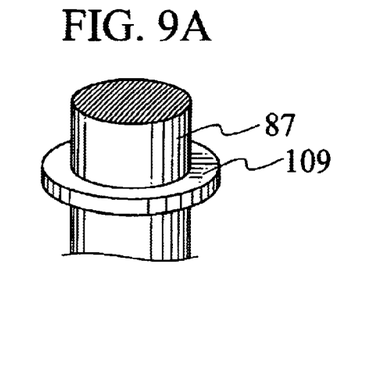
FIG. 9A is a schematic view illustrating a first modified form of the first stopper member.
Figure 9B:
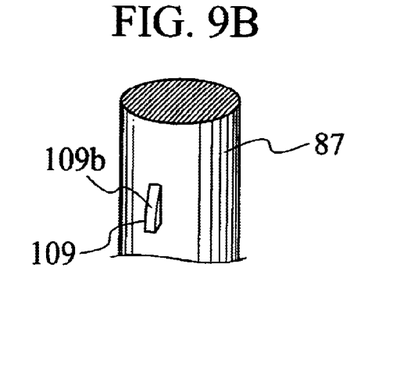
FIG. 9B is a schematic view illustrating a second modified form of the first stopper member.

In this case, the first stopper member 109 may not need to take the form of a shape that is movable, but may take the form of an annular flange, unitarily formed at the outer circumferential periphery of the elevator shaft 87 as shown in FIG. 9A, or a retractable protruding structure that downwardly protrudes from the elevator shaft 87, as shown in FIG. 9B, to be brought into abutting engagement with an upper terminal edge of the retainer sleeve section 89 whereas, when upwardly moving the retainer sleeve section 89, the protruding structure is retracted into the elevator shaft 87 due to a tapered surface 109b.

The second stopper member 111 takes the form of a coil spring 115 disposed on the elevator shaft 87 so as to surround the outer circumferential periphery thereof in an area beneath the support plate 81. The coil spring 115 has one end linked to the support plate 81 and the other end linked to an engagement aperture 117 of the elevator shaft 87 at the lowermost end thereof that supports the box 27. When the coil spring 115 is fully extended, the elevator shaft 87 is prevented from further lowering downward for thereby precluding the box 27 from being interfered with a bottom surface, and thus the second stopper member 111 cooperates with the first stopper member 109 to provide a double-safeguard function. Also, when the elevator shaft 87 remains in a lowered condition, the elevator shaft 87 is urged to be returned to the original position by the elastic force of the extended coil spring 115 and, thus, is enabled to be easily raised.

The box 27 engages the thread portion 107 formed on one of the elevator shaft 87 such that the box 27 is fixedly supported to be turned upside down.

The turntable 7, the monitor camera 119 and the camera 9 are mounted to the box 27.

The monitor camera 119 includes a CCD camera that is comprised of a synchronizing signal generator, an image signal generating unit and a transmitter, and an image signal generated by the image signal generating unit and transmitted from an antenna 121 is received at an antenna (not shown) of a receiver, located in an on-hand operation controller 123, to allow the image signal to be displayed over a display section 125 of the on-hand operation controller 123 on the ground.

The on-hand operation controller 123 includes, in addition to the display section 125 for a monitor display, a power supply 41, such as a battery, to supply an electric power to the controller 5, and control operation switches 127, with command signals outputted by the control operation switches 127 and the electric power delivered by the power supply 41 being inputted to the controller 5 via a cable 129.

The controller 5, the turntable 7 and the camera have the same component parts as those of the first embodiment except for the structure in that the camera 9 is mounted to the lower end of the elevator shaft 87 to be turned upside down and, so, the same component parts bear the same reference numerals as those of the first embodiment to omit redundant detailed description.

Consequently, with the structure of the second embodiment, when traveling to a photographing site with the automatic motion-controlled photographing apparatus 1, the vertically elongated elevator shaft 87 can be divided into plural pieces, providing an ease of carrying the elevator shaft 87. On the other hand, when using the automatic motion-controlled photographing apparatus 1 in the underground structure such as the hand hole, as shown in FIG. 5, the tripod 79 are opened and set at a position to straddle over the ground surface around an entrance 131 of the hand hole and, then, the elevator shaft 87 is lowered to move the camera 9 downward within the manhole 131. By confirming a lowering status of the camera 9 while viewing the monitor image, of the monitor camera 119, provided over the display section 125 of the on-band operation controller 123 and subsequently fixing the elevator shaft 87 by the shaft fixing screw 95 that serves as the fixing support means, the camera 9 is set at a desired position (depth) where the camera is turned upside down. Upon receipt of the command signal delivered from the on-hand operation controller 123, the camera 9 located at the desired position is exerted with quantitative rotational movements to rotate at an incremental given angle in response to the signal delivered from the turntable drive circuit 35. Concurrently, each time the camera 9 rotates at the given angle, the shutter 51 is turned on in response to the signal delivered from the shutter drive circuit 37, thereby obtaining photograph images in a series of frames at 360 degrees. In this case, the non-contact signal relay 49 enables the signal to be delivered between the rotatable camera 9 and the controller 5 remaining in the fixed condition without interference and, in the underground structure such as the hand hole where the person cannot enter or the manhole with the danger of oxygen deficiency or harmful gases, it is possible to obtain the accurate photograph images of the interiors under a safety condition without carrying out a ventilating operation for the interiors. While, in this instance, the photograph images are photographed in an inversed status, it is possible to easily perform the stitch editing work for permitting the photograph images in respective frames to be joined with no interference. Also, the stitch editing work can be completed in a short time period. Further, by using the photograph images, it becomes possible to prepare the same maintenance and facility management data as those of the on-site field.

The entire content of a Japanese Patent Application No. P2002-261930 with a filing date of Sep. 6, 2002 is herein incorporated by reference.

Although the invention has been described above by reference to certain embodiments of the present invention, the invention is not limited to the embodiments described above and will occur to those skilled in the art, in light of the teachings. The scope of the invention is defined with reference to the following claims.

What is claimed is:

1. An automatic motion-controlled photographing apparatus, comprising:
    a vertically extending and retracting tripod having a mount section;
    a controller fixedly supported on the mount section;
    a turntable rotatably supported on an upper surface of a box encompassing the controller; and
    a camera detachably supported on an upper surface of the turntable;
    wherein the controller includes a turntable drive circuit operative to rotate at least the turntable at a given rotational angle that is determined at an arbitrary angle, and a shutter drive circuit operative to turn on a shutter of the camera supported on the turntable via a non-contact signal relay at a time instant when rotation of the turntable at the given angle has been terminated.

2. An automatic motion-controlled photographing apparatus, comprising:
    a tripod having a retainer sleeve section internally formed with a guide portion to provide a guide in a vertical direction;
    a vertically elongated elevator shaft supported by the guide portion of the retainer sleeve section for freely vertical movements and adapted to be fixed at a given position and released by fixing and supporting means located in the retainer sleeve section;
    a controller fixedly supported the elevator shaft at a lower end thereof;
    a turntable rotatably supported on an upper surface of a box encompassing the controller;
    a camera and a monitor camera detachably supported on the turntable such that the camera and the monitor camera are turned upside down with respect to the turntable;
    wherein the controller includes a turntable drive circuit operative to rotate at least the turntable at a given rotational angle that is determined at an arbitrary angle, and a shutter drive circuit operative to turn on a shutter of the camera supported on the turntable via a non-contact signal relay at a time instant when rotation of the turntable at the given angle has been terminated.

3. The automatic motion-controlled photographing apparatus of claim 1, wherein the tripod, the controller and the turntable are formed in a unit structure independently structured from the camera.

4. The automatic motion-controlled photographing apparatus of claim 2, wherein the tripod, the controller and the turntable are formed Win a unit structure independently structured from the camera.

5. The automatic motion-controlled photographing apparatus of claim 1, wherein the turntable includes a camera mount unit that allows the camera to be mounted in a standard mount position in which a photograph image with an elongated length aligned in a lateral direction is provided and a vertically oriented position in which a photograph image with the elongated length aligned in a vertical direction is provided.

6. The automatic motion-controlled photographing apparatus of claim 2, wherein the turntable includes a camera mount unit that allows the camera to be mounted in a standard mount position in which a photograph image with an elongated length aligned in a lateral direction is provided and a vertically oriented position in which a photograph image with the elongated length aligned in a vertical direction is provided.

7. The automatic motion-controlled photographing apparatus of claim 2, wherein the elevator shaft is longitudinally connected and detachably coupled so as to be divided into a plurality of shaft components.

8. A method of photographing through the use of an automatic motion-controlled photographing apparatus, the method comprising:

setting a tripod in an opened state so as to straddle over an entrance of an underground structure;

moving a camera through the entrance downwardly into the underground structure by an elevator shaft supported by the tripod for elevating capabilities;

positioning the camera until the camera being positioned in a given position by using a monitor camera that provides a status of the camera's position;

intermittently rotating the camera, that is located at the given position, at a predetermined angle set in an arbitrary angle of rotation; and photographing photograph images consecutively, each in one frame, at an angle of 360 degrees by permitting a shutter of the camera to be turned on responsive to a signal from a shutter drive circuit when rotational movement of the camera is completed.

* * * * *